United States Patent
Marafino

(10) Patent No.: US 10,647,272 B2
(45) Date of Patent: May 12, 2020

(54) VIDEO/MULTIMEDIA INTERFACE SOLUTION

(71) Applicant: United Radio, Inc., East Syracuse, NY (US)

(72) Inventor: Daniel F. Marafino, West Monroe, NY (US)

(73) Assignee: United Radio, Inc., East Syracuse, NY (US)

( * ) Notice: Subject to any disclaimer, the term of this patent is extended or adjusted under 35 U.S.C. 154(b) by 325 days.

(21) Appl. No.: 15/213,635

(22) Filed: Jul. 19, 2016

(65) Prior Publication Data

US 2017/0021780 A1    Jan. 26, 2017

Related U.S. Application Data

(60) Provisional application No. 62/194,562, filed on Jul. 20, 2015.

(51) Int. Cl.
*B60R 16/023*    (2006.01)
*B60R 1/00*    (2006.01)

(52) U.S. Cl.
CPC .............. *B60R 16/023* (2013.01); *B60R 1/00* (2013.01); *B60R 2300/105* (2013.01); *B60R 2300/40* (2013.01)

(58) Field of Classification Search
CPC ... B60R 16/023; B60R 1/00; B60R 2300/105; B60R 2300/40

USPC .......................................................... 348/148
See application file for complete search history.

(56) References Cited

U.S. PATENT DOCUMENTS

| | | | | |
|---|---|---|---|---|
| 8,930,072 | B1* | 1/2015 | Lambert | G07C 5/0866 348/222.1 |
| 2004/0046646 | A1* | 3/2004 | Eskridge | G08G 1/017 340/425.5 |
| 2006/0187238 | A1* | 8/2006 | Yoneji | B60R 1/00 345/629 |
| 2015/0001870 | A1* | 1/2015 | Parcher | B60K 35/00 296/1.07 |
| 2015/0352953 | A1* | 12/2015 | Koravadi | B60K 37/06 701/36 |

* cited by examiner

*Primary Examiner* — On S Mung
(74) *Attorney, Agent, or Firm* — Bond Schoeneck & King, PLLC; George McGuire

(57) ABSTRACT

A method for retrofitting a vehicle device, the method comprising the steps of: (i) providing an interface device with a wiring harness and a control system; (ii) connecting the wiring harness between a first input of a vehicle component and an input of the vehicle device, wherein the wiring harness is configured to communicate a signal from the first input to the vehicle device input, and further wherein the wiring harness is configured to communicate a signal from the first input to the control system; (iii) detecting, by the control system, one or more data settings of the vehicle device; and (iv) modifying, by the control system, the one or more data settings of the vehicle device such that the vehicle device can process the signal from the first input.

14 Claims, 6 Drawing Sheets

VIDEO/MULTIMEDIA INTERFACE SOLUTION

CROSS REFERENCE TO RELATED APPLICATIONS

This application claims priority to U.S. Provisional Patent Application Ser. No. 62/194,562, filed on Jul. 20, 2015 and entitled "Video/Multimedia Interface Solution," the entire disclosure of which is incorporated herein by reference.

FIELD OF THE INVENTION

The present disclosure relates generally to an interfacing solution for vehicles, and more specifically to system configured to retrofit a factory-equipped multimedia display to enable one or more additional video inputs.

BACKGROUND

It is common for vehicles to include a factory-installed multi-purpose communications and entertainment system. These in-car systems often include a visual display in the dashboard that simultaneously functions as the user interface. The in-car system typically includes functionality such as GPS, radio controls, Bluetooth and WiFi connectivity, traffic alerts, emergency assistance, vehicle reports, and other functionality. The in-car system may even include voice control.

However, it is often difficult and expensive to modify these factory-installed in-car systems to add functionality beyond that which was originally envisioned or designed. For example, it is becoming increasingly common for vehicles to include one or more video inputs from around the car, including in the front and back of the car. As just one example, it is often desirable to modify a factory-installed in-car system to add a video feed for a camera located in the back of the vehicle which operates when the car is in reverse or is parking. As desirable and useful as this additional feed might be, it is often expensive to modify the programming of the in-car system to allow for an additional input feed.

Accordingly, there is a need in the art for an easy and affordable way to retrofit a factory-installed in-car display to enable one or more additional video inputs.

SUMMARY OF THE INVENTION

The present disclosure is directed to an inventive system configured to retrofit a factory-equipped multimedia display to enable one or more additional video inputs. Embodiments of the inventive system comprise an interfacing solution having two parts, namely a control system configured to read and change current vehicle configuration data, and a wiring harness configured to utilize pre-existing video inputs on the multimedia display. According to an embodiment the interface is a "plug and play" configuration in which a permanent modification of existing vehicle wiring is not required. According to an embodiment, the interface solution can only be used for one vehicle and will be locked to the unique Vehicle Identification Number ("VIN"). With the improved interfacing solution, it is possible to input one or more additional video feeds to the system, which could be any of a variety of inputs including a back-up video feed among many others.

Generally, in one aspect, a method for retrofitting a vehicle device is provided. The method includes the steps of: (i) providing an interface device comprising a wiring harness and a control system; (ii) connecting the wiring harness between a first input of a vehicle component and an input of the vehicle device, wherein the wiring harness is configured to communicate a signal from the first input to the vehicle device input, and further wherein the wiring harness is configured to communicate a signal from the first input to the control system; (iii) detecting, by the control system, one or more data settings of the vehicle device; and (iii) modifying, by the control system, the one or more data settings of the vehicle device such that the vehicle device can process the signal from the first input.

According to an embodiment, the vehicle component is a camera.

According to an embodiment, the vehicle device is selected from the group consisting of a radio head unit, a radio display, a radio button interface, and an instrument control panel.

According to an embodiment, the method further includes the steps of determining, by the control system, a vehicle identification number for the vehicle; comparing the determining vehicle identification number to a database of vehicle identification numbers; and allowing, if the determined vehicle identification number matches one of the vehicle identification numbers in the database, the interface device to provide the signal from the first input to the vehicle device.

According to an embodiment, the control system is further configured to prevent communication of the signal from the first input to the vehicle device when the determined vehicle identification number fails to match one of the vehicle identification numbers in the database.

According to an embodiment, the control system resets the vehicle device such that the vehicle device can process the signal from the first input.

According to an embodiment, the wiring harness is further configured to provide power to the vehicle component.

According to an embodiment, the interface device is configured to receive an input signal from a plurality of vehicle components.

According to an aspect is an interface device for retrofitting a vehicle device, the interface device comprising: a wiring harness configured to be connected between a first input of a vehicle component and an input of the vehicle device, wherein the wiring harness is further configured to communicate a signal from the first input to the vehicle device input; and a control system configured to: (i) receive the first input signal from the wiring harness; (ii) detect one or more data settings of the vehicle device; and (iii) modify the one or more data settings of the vehicle device such that the vehicle device can process the signal from the first input.

According to an aspect is an interface system, the system comprising: a camera configured to generate a video signal; a vehicle component comprising a signal input configured to receive a signal; a wiring harness configured to be connected between the camera and the vehicle device, wherein the wiring harness is further configured to communicate the first signal from the camera to the signal input of the vehicle device; and a control system configured to: (i) receive the first input signal from the wiring harness; (ii) detect one or more data settings of the vehicle device; and (iii) modify the one or more data settings of the vehicle device such that the vehicle device can process the signal from the first input.

These and other aspects and embodiments of the invention will be described in greater detail below, and can be further derived from reference to the specification and figures.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure is directed to methods and systems for retrofitting a factory-equipped multimedia display to enable one or more additional video inputs. According to an embodiment, therefore, is an interfacing device or system with a control system configured to read and change current vehicle configuration data, and a wiring harness configured to utilize pre-existing video inputs on a multimedia display. With the improved interfacing solution, it is possible to input one or more additional video feeds to the system, which could be any of a variety of inputs including a back-up video feed among many others.

In view of the foregoing, various embodiments and implementations are directed to a device or system comprising a wiring harness and a control system. The wiring harness and control system work in conjunction to enable functionality and provide a means of egress for one or more composite or differential video signals to the factory-equipped display in the vehicle. The interface can be, for example, is a "plug and play" configuration in which a permanent modification of existing vehicle wiring is not required. The interface solution can be structured such that it may only be used for one vehicle and will be locked to the unique Vehicle Identification Number ("VIN"). According to just one example of the system, the display can be a MyFord® radio/multimedia display with 12-pin power and signal connector, although many other displays and in-car systems can be utilized. Indeed, the devices and systems described or otherwise envisioned herein may be utilized with any display or in-car system.

Figure 1:
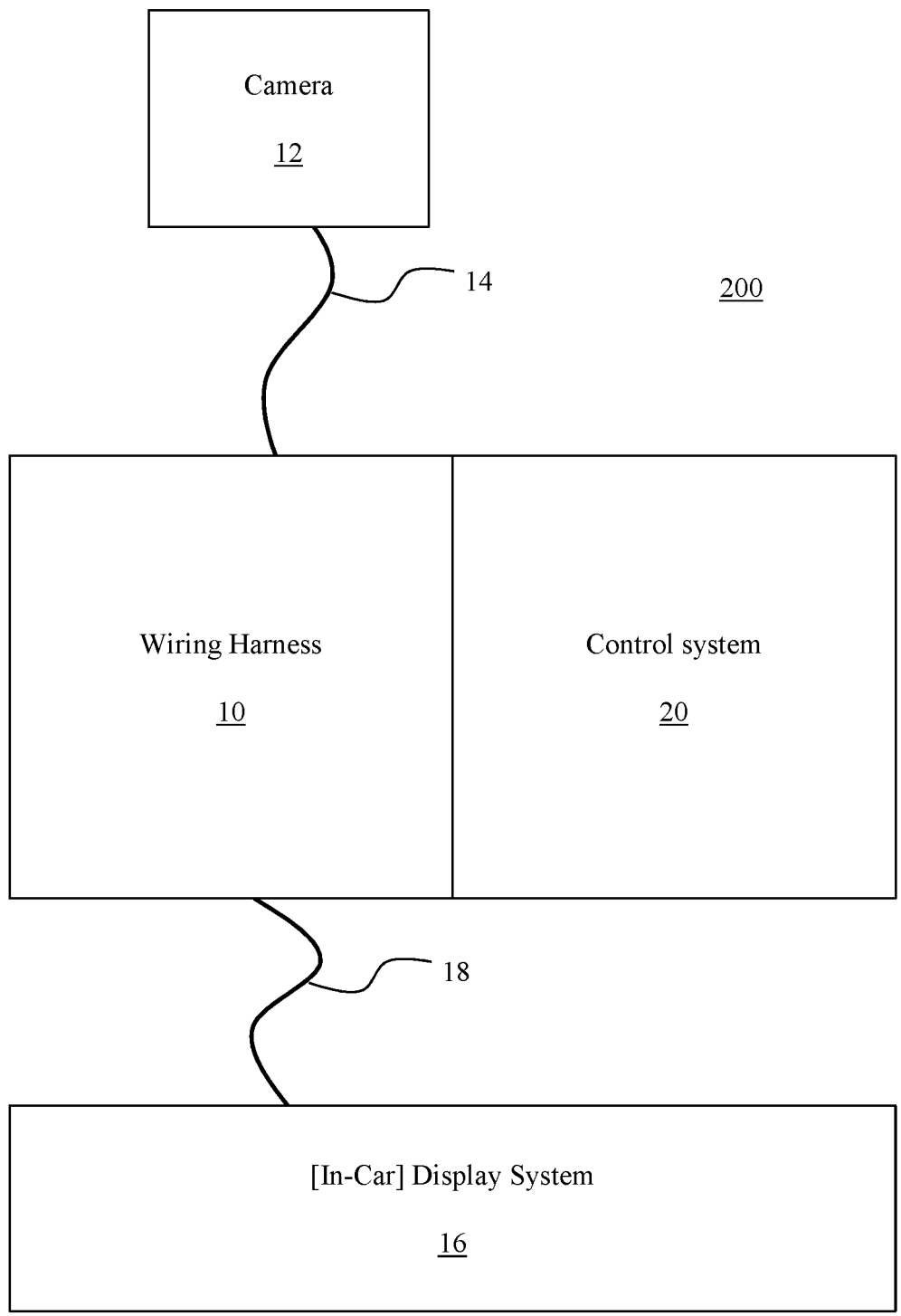
FIG. 1 is a schematic representation of a retrofit interface system, in accordance with an embodiment.

Referring now to the drawings, wherein like reference numerals refer to like parts throughout, there is seen in FIG. 1 a retrofit interface system 100. Retrofit interface system 100 comprises a wiring harness 10 and a control system 20. According to an embodiment, the vehicle or system comprises a vehicle device or display system 16, which can be an in-car display system. This might be, for example, a factory-installed display system, or a display system that was later installed. The factory-installed display system does not include the target factory-installed video or other input feed that is being added during the retrofit. In addition, the vehicle device or display system 16 can be any module in a vehicle including, but not limited to, a radio head unit; radio display; radio button interface; instrument control panel; body control module; transmission control module; engine control module; and/or any additional modules found on the same communications network.

The new wiring harness 10 is connected to display system 16 by one or more communications systems 18, and to the camera, video, or other input device 12 by one or more communications systems 14. The communications systems 14 and 18 can be a simple wired and/or wireless communication method, a communications bus, or any of a wide variety of communication methods. For example, the communication method might be wireless, in which case the camera, wiring harness, and/or display system might comprise a wireless communication module to communicate with one or more other components.

Figure 2:
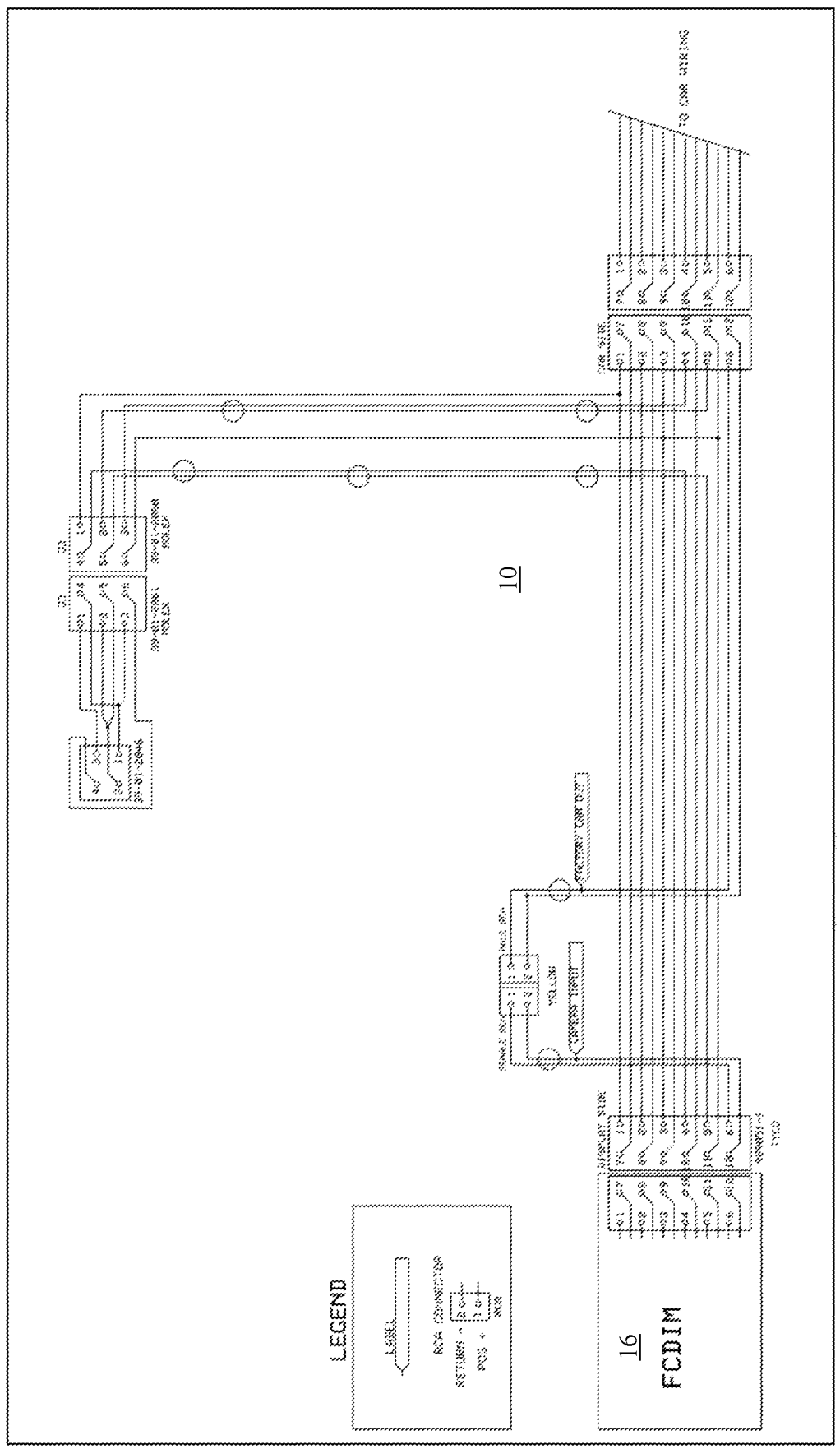
FIG. 2 is a schematic representation of a wiring harness of the retrofit interface system, in accordance with an embodiment.
Figure 3:
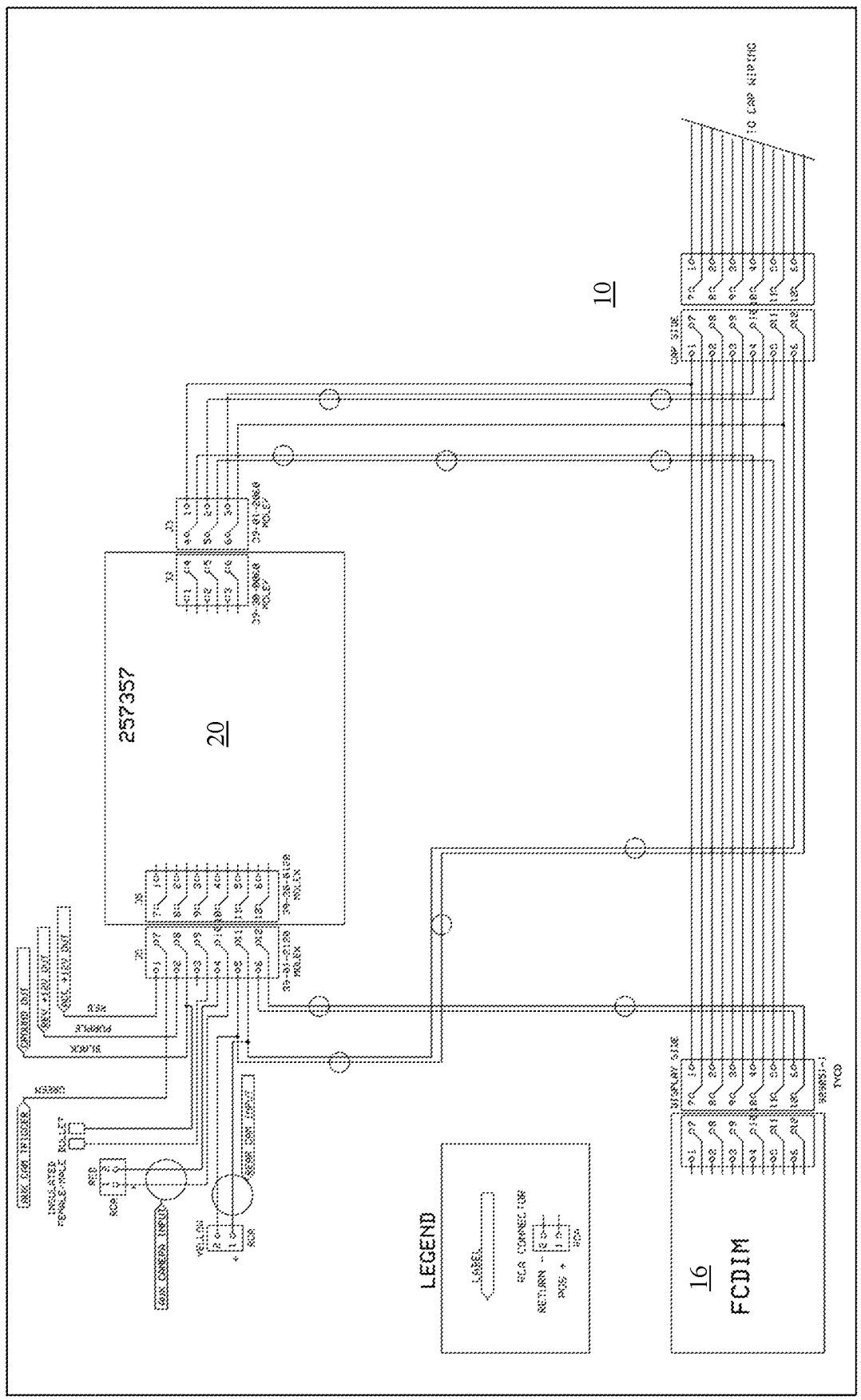
FIG. 3 is a schematic representation of a wiring harness of the retrofit interface system, in accordance with an embodiment.

Referring to FIG. 2, in one embodiment, is a schematic of one possible wiring harness 10. The wiring harness 10 is placed between the vehicle's factory wiring and the display system 16 of the vehicle. For example, the display system receiving the input from the wiring hardness might be a Front Control Display Interface Module ("FCDIM") as shown in FIG. 2. Referring now to FIG. 3, in one embodiment, is an alternate configuration of the wiring harness combined with the control system capable of offering multiple video inputs. In FIG. 3 is a schematic representation of a wiring harness design 10, the design comprising a control module 20 capable of working with multiple vehicles with an adjoining vehicle-specific harness.

According to the embodiments depicted in FIGS. 2 and 3 or as otherwise envisioned, the wiring harness 10 can utilize 12-pin connectors, such as 929051-1 connectors, on either end, although many other connection mechanisms are possible. According to one embodiment, these mating connectors offer a plug and play interface to the factory wiring at the rear of the FCDIM. This wiring harness is then capable of interrupting the factory camera signal and sending it to the control system 20, and also populating otherwise unpopulated connections to allow a video signal, such as a signal from a camera, to be introduced to the FCDIM. Wiring harness 10 thus allows integration of the control system along with an RCA video input connection with no permanent modification to factory wiring.

Figure 4:
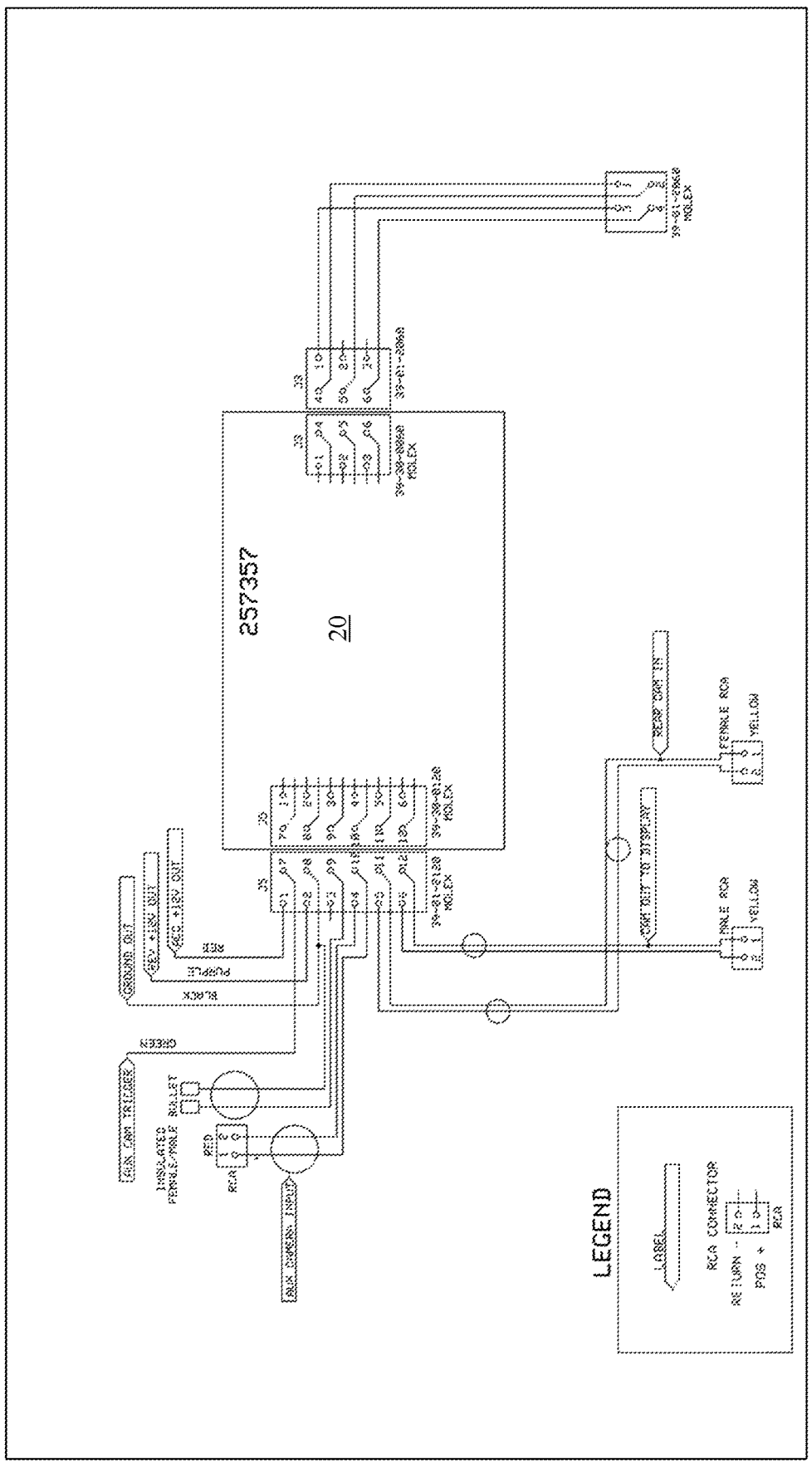
FIG. 4 is a schematic representation of a wiring design, in accordance with an embodiment.

Referring to FIG. 4 is another embodiment of the system, comprising a supplemental wiring harness. The supplemental wiring harness 10 can be used with the control system 20 to allow for video input from either the factory equipped camera, or an aftermarket camera. This harness will also allow for connections from the control system to output switched power outputs such as but not limited to accessory or reverse switched 12V power. Other connections on this harness can include, for example, a 2-position jumper for initiation of programming, two composite video inputs, and a manual activation trigger wire. Many other connections are possible.

Figure 5A:
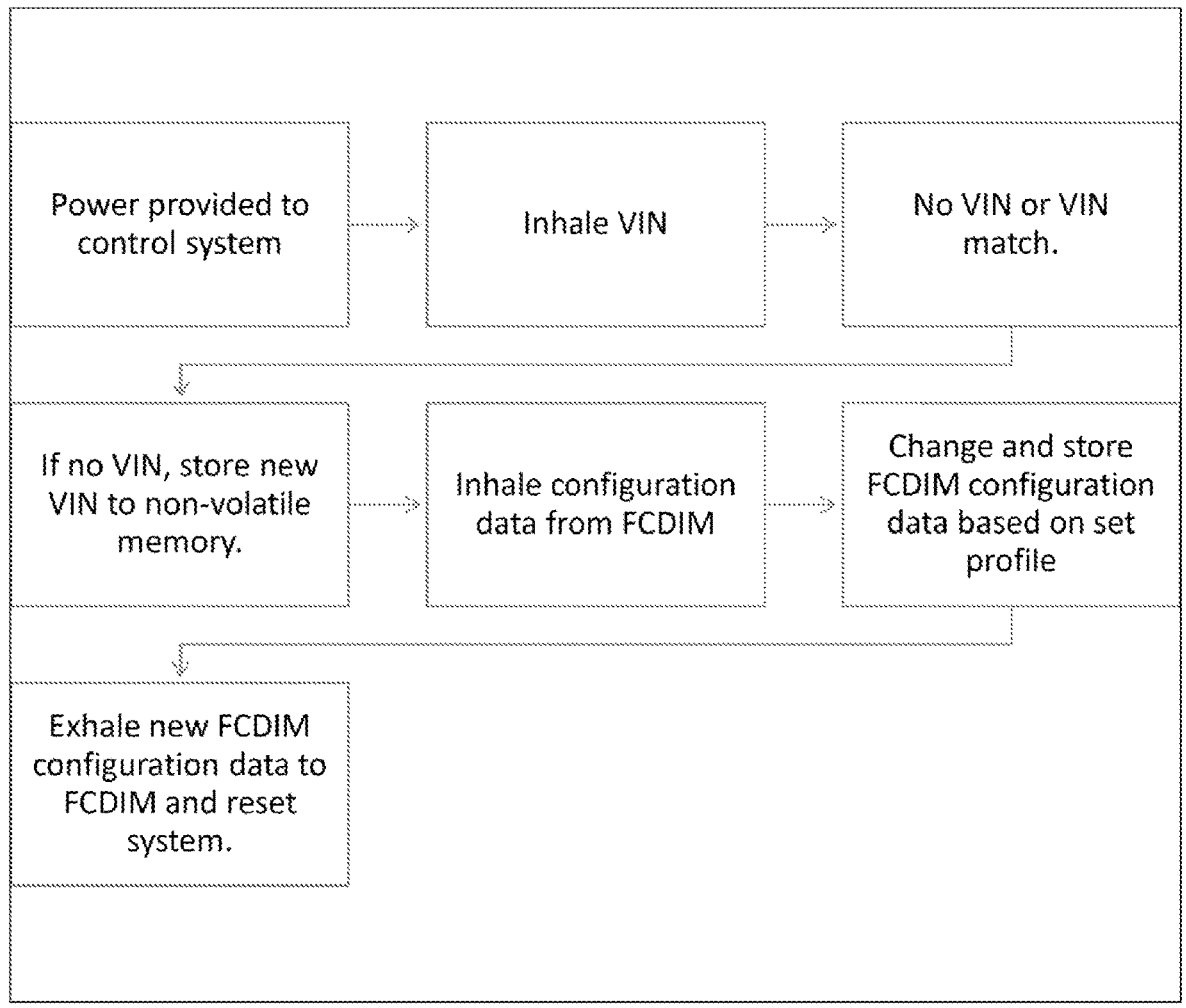
FIG. 5A is a flowchart of a method for a retrofit interface control system, in accordance with an embodiment.

Referring to FIG. 5A, in accordance with an embodiment, is a flowchart of a method for a control system. According to an embodiment, the control system 20 is a processor-controlled module configured to read and write data to one or more data communication buses in a vehicle. As shown in FIG. 5A, which is a flow chart of a method using control system 20, the primary function of the control system is to read the existing vehicle configuration data by way of an inhale function, manipulate the data based on a preset configuration, and use an exhale function to reprogram a vehicle device. The vehicle device can be any preinstalled module in a vehicle including, but not limited to, a radio head unit; radio display; radio button interface; instrument control panel; body control module; transmission control module; engine control module; and/or any additional modules found on the same communications network.

Figure 5B:
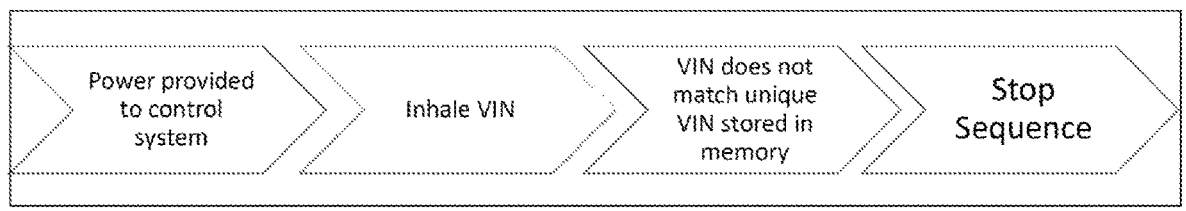
FIG. 5B is a flowchart of a method for a retrofit interface control system, in accordance with an embodiment.

According to an embodiment, the inhale/exhale function is dependent on security verification that the device has not been used on more than one vehicle, as shown in FIG. 5B. This is achieved by reading the unique VIN from the data communications network and comparing it to one stored on the non-volatile memory of the control system. Upon powering of the control system, if there is no VIN present in the memory, or the VIN in memory matches that of the data communications network, the control system will proceed with the inhale/exhale function. If the VIN is found not to match that in the memory, the control system will halt all processes until power is removed and reconnected, at which point it will start the process over again. A particular embodiment of this flow is detailed in FIGS. 5A and 5B.

According to an embodiment, the secondary function of the control system is to provide switched power outputs based on vehicle data system messages on a constant basis. This power can be used to power accessories such as but not limited to a safety system. Functions of the inhale and exhale are preset by software which is stored on the non-volatile memory of the control module. These functions can be determined and changed by multiple methods including serial commands, USB Bootload, and on-board dip-switch setting.

Figure 6:
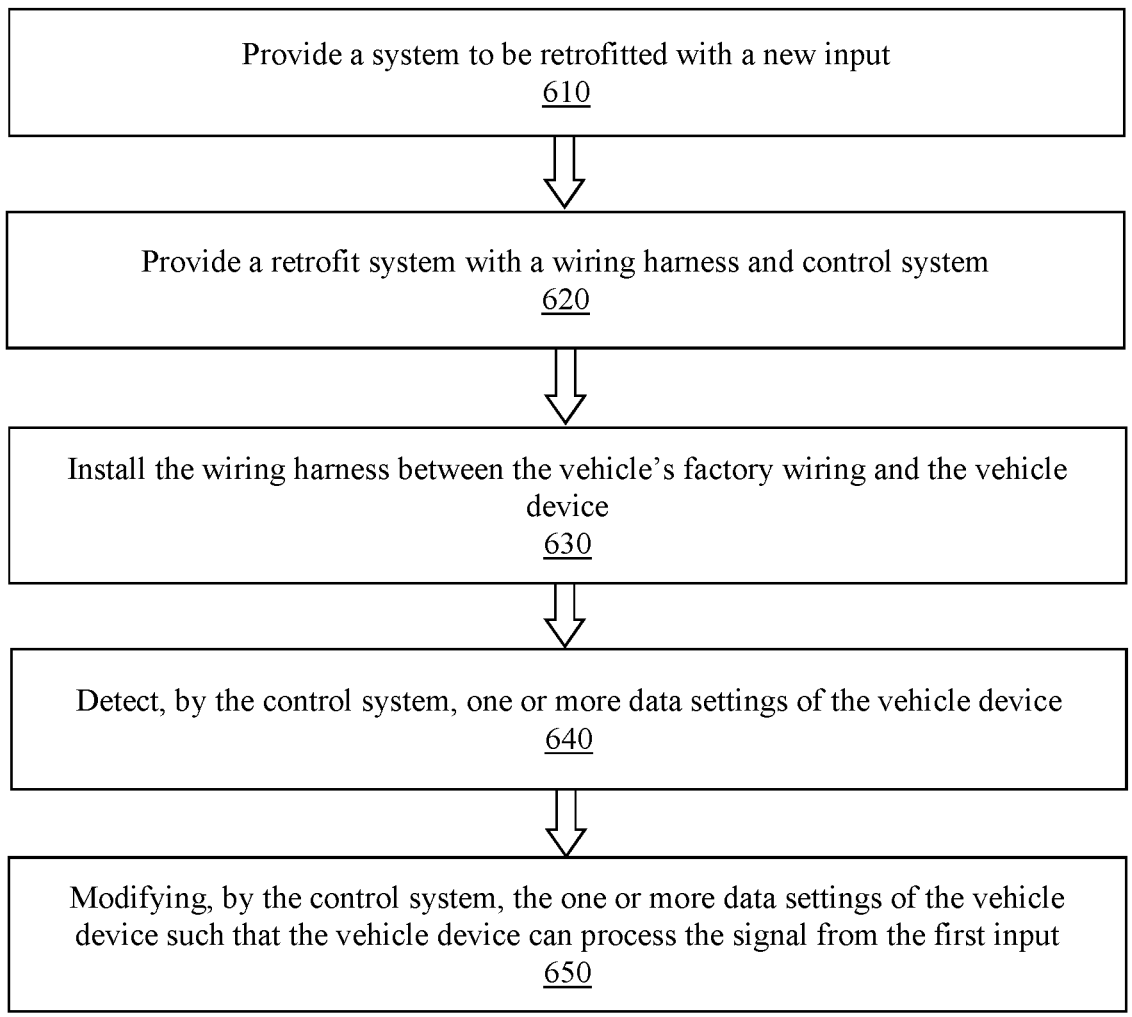
FIG. 6 is a flowchart of a method for installing a retrofit interface system, in accordance with an embodiment.

Referring to FIG. 6, in one embodiment, is a flowchart of a method for installing a retrofit interface system. The system can be any of the systems or devices described or otherwise envisioned herein. At step 610 of the method, a system to be retrofitted is provided or identified. For example, a customer may bring a vehicle to a dealer or shop in order for addition of a video feed such as a back-up camera to be added to a display system of the vehicle. As another example of many, the retrofit may be part of a general upgrade of the vehicle which comprises many different components. Rather than a backup camera, the input can be any of a wide variety of other video feeds and/or other inputs.

At step 620 of the method, the retrofit system is provided. The retrofit system can be any of the retrofit systems or devices described or otherwise envisioned herein. For example, the retrofit system can comprise a wiring harness 10, control system 20, and/or communications systems 14 and/or 18. According to an embodiment, the retrofit system includes a camera or other video input, or any other feed or input that the system is designed to provide to the display for the retrofit.

At step 630 of the method, the wiring harness is placed between the vehicle's factory wiring and the vehicle device or display system 16 of the vehicle. For example, the display system receiving the input from the wiring hardness might be a Front Control Display Interface Module ("FCDIM") as shown in FIG. 2. Referring now to FIG. 3, in one embodiment, is an alternate configuration of the wiring harness combined with the control system capable of offering multiple video inputs. In FIG. 3 is a schematic representation of a wiring harness design 10, the design comprising a control module 20 capable of working with multiple vehicles with an adjoining vehicle-specific harness. According to one embodiment, the system may utilize a simple plug and play interface to the factory wiring to the display, or the wiring connection may be more complicated and require additional steps to connect.

At step 640 of the method, the control system detects one or more vehicle configuration data settings of the vehicle device.

The control system is, for example, a processor-controlled module configured to read and write data to one or more data communication buses in a vehicle. The control system can, for example, read the existing vehicle configuration data settings by way of an inhale function, manipulate the data based on a preset configuration, and use an exhale function to reprogram the newly-associated vehicle device. Thus, the wiring harness interrupts the factory camera signal and sends it to the control system 20, populating otherwise unpopulated connections to allow a video signal, such as a signal from a camera, to be introduced to the vehicle device or display system 16.

According to an embodiment, the inhale/exhale function is dependent on security verification that the device has not been used on more than one vehicle. Accordingly, the system can read the unique VIN from the data communications network and compare it to a database of VINs stored on the non-volatile memory of the control system. Upon powering of the control system, if there is no VIN present in the memory, or the VIN in memory matches that of the data communications network, the control system will proceed with the inhale/exhale function. If the VIN is found not to match that in the memory, the control system will halt all processes until power is removed and reconnected, at which point it will start the process over again. According to an embodiment, a secondary function of the control system is to provide switched power outputs based on vehicle data system messages on a constant basis. This power can be used to power accessories such as but not limited to a safety system.

Accordingly, at step 650, a signal is provided from the new input to the vehicle device via the retrofit system, based on the detected vehicle configuration data settings of the vehicle device. The retrofit system receives a signal from the video input or other feed, for example a newly-installed backup camera, and sends it to the vehicle device. The vehicle device can be reprogrammed or modified by the control system after detecting the one or more settings of the vehicle device or can modify the input feed to provide an acceptable input to the vehicle device.

Although the present invention has been described in connection with a preferred embodiment, it should be understood that modifications, alterations, and additions can be made to the invention without departing from the scope of the invention as defined by the claims.

What is claimed is:

1. A method for retrofitting a vehicle device for a vehicle, the method comprising the steps of:
    providing an interface device comprising a wiring harness and a control system, wherein the interface device is new to the vehicle;
    connecting the wiring harness between a first input of a vehicle component and an input of the vehicle device, wherein the wiring harness is configured to communicate a signal from the first input to the vehicle device input, and further wherein the wiring harness is configured to communicate a signal from the first input to the control system, and further wherein the vehicle component and the vehicle device are previously installed in the vehicle relative to the provided interface device;
    detecting for the first time, by the newly-connected control system, one or more preexisting vehicle configuration data settings of the vehicle device;
    modifying, by the control system, the one or more preexisting vehicle configuration data settings of the vehicle device such that the vehicle device can process the signal from the first input;

determining, by the control system using information transmitted from the vehicle component to the control system via the wiring harness, a vehicle identification number for the vehicle;

comparing the determining vehicle identification number to a database of vehicle identification numbers;

allowing, if the determined vehicle identification number matches one of the vehicle identification numbers in the database, the interface device to provide the signal from the first input to the vehicle device; and preventing communication of the signal from the first input to the vehicle device if the determined vehicle identification number fails to match one of the vehicle identification numbers in the database.

2. The method of claim 1, wherein the vehicle component is a camera.

3. The method of claim 1, wherein the vehicle device is selected from the group consisting of a radio head unit, a radio display, a radio button interface, and an instrument control panel.

4. The method of claim 1, wherein the control system resets the vehicle device such that the vehicle device can process the signal from the first input.

5. The method of claim 1, wherein the wiring harness is further configured to provide power to the vehicle component.

6. The method of claim 1, wherein the interface device is configured to receive an input signal from a plurality of vehicle components.

7. An interface device for retrofitting a vehicle device, the interface device comprising:

a wiring harness configured to be connected between a first input of a vehicle component and an input of the vehicle device, wherein the wiring harness is further configured to communicate a signal from the first input to the vehicle device input; and a control system configured to: (i) receive the first input signal from the wiring harness; (ii) detect for the first time one or more vehicle configuration data settings of the vehicle device; and (iii) modify the one or more vehicle configuration data settings of the vehicle device such that the vehicle device can process the signal from the first input; (iv) determine, using information transmitted from the vehicle component to the control system via the wiring harness, a vehicle identification number for the vehicle; (v) compare the determining vehicle identification number to a database of vehicle identification numbers; (vi) allow, if the determined vehicle identification number matches one of the vehicle identification numbers in the database, the interface device to provide the signal from the first input to the vehicle device; and (vii) prevent communication of the signal from the first input to the vehicle device if the determined vehicle identification number fails to match one of the vehicle identification numbers in the database;

wherein the wiring harness and control system are new to the vehicle, and further wherein the vehicle component and the vehicle device are previously installed in the vehicle relative to the provided interface device.

8. The interface device of claim 7, wherein the vehicle component is a camera.

9. The interface device of claim 7, wherein the vehicle device is selected from the group consisting of a radio head unit, a radio display, a radio button interface, and an instrument control panel.

10. The interface device of claim 7, wherein the wiring harness is further configured to provide power to the vehicle component.

11. The interface device of claim 7, wherein the interface device is configured to receive an input signal from a plurality of vehicle components.

12. An interface system, the system comprising:

a camera configured to generate a video signal;

a vehicle component comprising a signal input configured to receive a signal;

a wiring harness configured to be connected between the camera and the vehicle device, wherein the wiring harness is further configured to communicate the first signal from the camera to the signal input of the vehicle device; and a control system configured to: (i) receive the first input signal from the wiring harness; (ii) detect for the first time one or more vehicle configuration data settings of the vehicle device; (iii) modify the one or more vehicle configuration data settings of the vehicle device such that the vehicle device can process the signal from the first input; (iv) determine, using information transmitted from the vehicle component to the control system via the wiring harness, a vehicle identification number for the vehicle; (v) compare the determining vehicle identification number to a database of vehicle identification numbers; (vi) allow, if the determined vehicle identification number matches one of the vehicle identification numbers in the database, the interface device to provide the signal from the first input to the vehicle device; and (vii) prevent communication of the signal from the first input to the vehicle device if the determined vehicle identification number fails to match one of the vehicle identification numbers in the database;

wherein the wiring harness and control system are new to the vehicle, and further wherein the vehicle component and the camera are previously installed in the vehicle relative to the provided interface device.

13. The interface system of claim 12, wherein the vehicle device is selected from the group consisting of a radio head unit, a radio display, a radio button interface, and an instrument control panel.

14. The interface system of claim 12, wherein the wiring harness is further configured to provide power to the vehicle component.

\* \* \* \* \*